United States Patent
Huke et al.

(10) Patent No.: US 12,494,108 B2
(45) Date of Patent: Dec. 9, 2025

(54) PLAYER REPRESENTATION WAGER DISPLAY

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/528,750

(22) Filed: Nov. 17, 2021

(65) Prior Publication Data
US 2022/0157113 A1 May 19, 2022

Related U.S. Application Data

(60) Provisional application No. 63/115,730, filed on Nov. 19, 2020.

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *G06Q 50/34* | (2012.01) |
| *G07F 17/32* | (2006.01) |

(52) U.S. Cl.
CPC .......... *G07F 17/323* (2013.01); *G06Q 50/34* (2013.01); *G07F 17/3211* (2013.01); *G07F 17/3288* (2013.01)

(58) Field of Classification Search
CPC ... G07F 17/32; G07F 17/3211; G07F 17/3214
USPC ............... 463/1, 10, 11, 20, 22, 25, 30
See application file for complete search history.

(56) References Cited

U.S. PATENT DOCUMENTS

| | | | | |
|---|---|---|---|---|
| 2007/0093234 | A1* | 4/2007 | Willis | G06F 21/6245 |
| | | | | 455/410 |
| 2008/0220856 | A1* | 9/2008 | Lynch | G07F 17/329 |
| | | | | 463/25 |
| 2009/0176557 | A1* | 7/2009 | Hall | A63F 13/30 |
| | | | | 463/43 |
| 2011/0070940 | A1 | 3/2011 | Jaffe et al. | |
| 2011/0212761 | A1* | 9/2011 | Paulsen | G07F 17/3202 |
| | | | | 345/522 |
| 2017/0358173 | A1* | 12/2017 | Mccafferty | G07F 17/3239 |
| 2019/0236892 | A1 | 8/2019 | English | |
| 2021/0256797 | A1* | 8/2021 | Huke | G07F 17/323 |

OTHER PUBLICATIONS

International Search Report and Written Opinion issued on Feb. 14, 2022 in corresponding International Patent Application No. PCT/US2021/059866; 10 pages.

* cited by examiner

*Primary Examiner* — Adetokunbo O Torimiro
(74) *Attorney, Agent, or Firm* — Maier & Maier, PLLC

(57) ABSTRACT

A method of informing a user of a sports betting application of his or her performance compared to the user's friends or other users, e.g., this user just fell behind his friend, or this user is doing the best out of his group of friends.

3 Claims, 3 Drawing Sheets

PLAYER REPRESENTATION WAGER DISPLAY

FIELD

Figure 1:
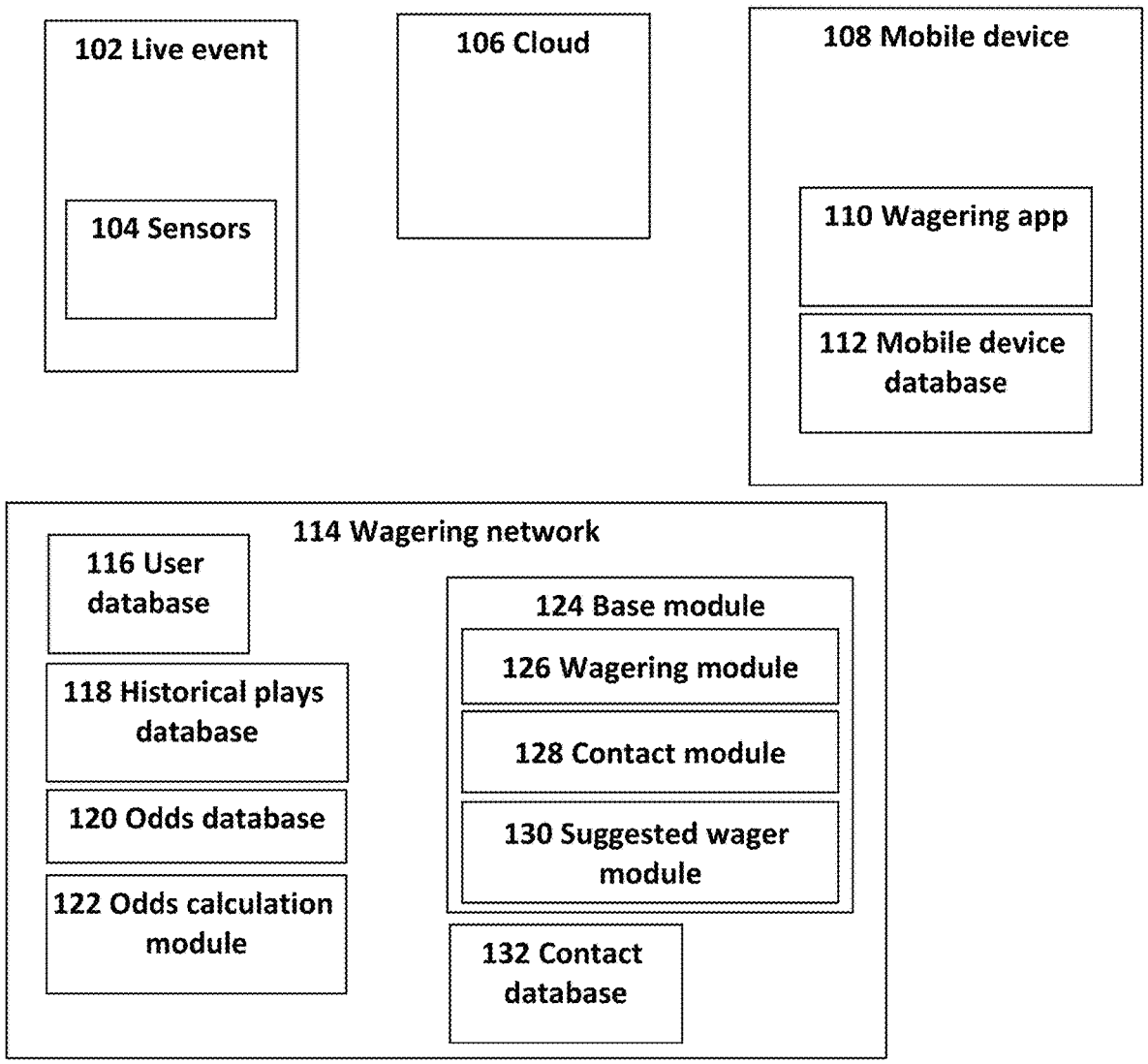

The present embodiments are generally related to play-by-play wagering on live sporting events.

BACKGROUND

Many people enjoy watching and wagering on sporting events with others. However, gathering people together physically may be inconvenient and/or dangerous due to circumstances like a pandemic.

Participation in sports wagering may decrease when individuals do not gather with friends or family. Indeed, people may even reduce their wager amounts or may not watch or wager on major sporting events at all.

Also, people may be less interested in watching certain events—and in turn wagering on those events—without interested friends or family present. For example, some people may only watch American football with their father, a huge fan, or may only watch baseball with their friends. These people would likely not place wagers on these events otherwise.

SUMMARY

Methods, systems, and apparatuses for player representation wager display may be shown and described. In one embodiment, a method of suggesting wagers to a user based on the contacts of the user in a sports betting network can include receiving contact data from a user on the sports betting network; searching a user database for the received contact data; storing the contact data with an associated data set in a contact database or notifying the user if unable to store the contact data; determining when a new wager data entry has been stored in the user database, extracting a user ID from the wager new data entry; comparing the user ID with contact data in the contact database for a match; and sending a notification to inform the user of the new wager data entry.

In another embodiment, a system for suggesting wagers to a user based on the contacts of the user in a sports betting network can include a base module; a contact module; a suggested wager module; a contact database; a user database, where the base module is configured to poll for user activity, initiate the suggested wager module, poll for a request to add a new contact, and initiate the contact module; the contact module is configured to receive contact data from a user, search the user database for a match with the received contact data, store the received contact data in the contact database, or inform the user if unable to store the contact data; the suggested wager module is configured to poll for at least one new wager data entry in the user database, extract the new wager data entry, compare the extracted wager data entry with the contact database for a match, and inform the user of the wager data entry if there is a match; and the contact database is configured to contain at least one user ID and at least one name of a contact of the user.

BRIEF DESCRIPTIONS OF THE DRAWINGS

The accompanying drawings illustrate various embodiments of systems, methods, and various other aspects of the embodiments. Any person with ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for suggesting wagers based on wagers made by contacts, according to an embodiment.

Figure 2:
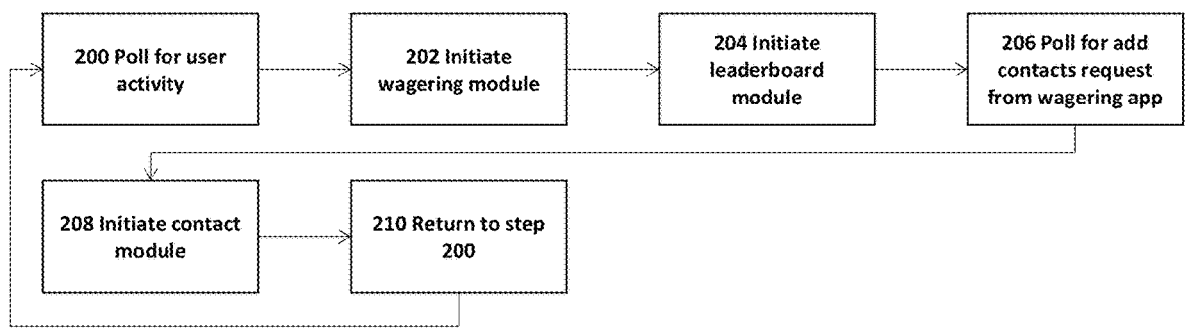

FIG. 2: illustrates a base module, according to an embodiment.

Figure 3:
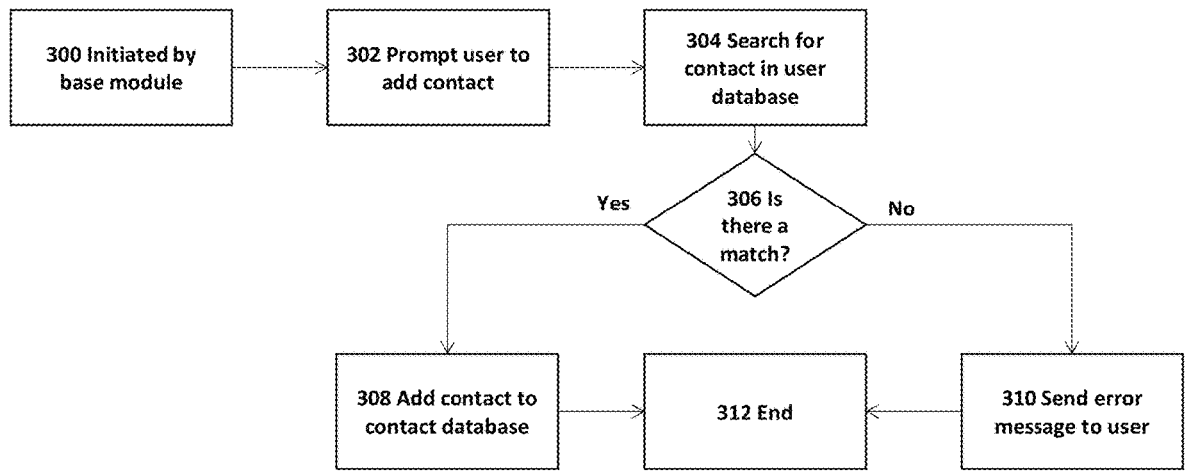

FIG. 3: illustrates a contact module, according to an embodiment.

Figures 4, 5:
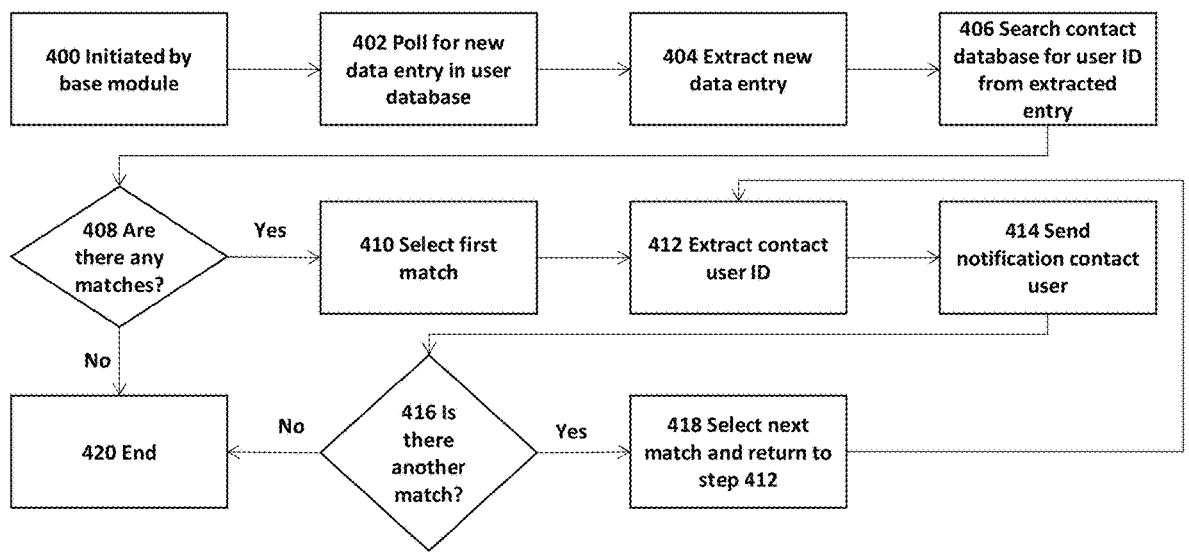

FIG. 4: illustrates a suggested wager module, according to an embodiment.

FIG. 5: illustrates a contact database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or omitted not to obscure the relevant details of the invention.

As used herein, the word exemplary means serving as an example, instance, or illustration. The embodiments described herein are not limiting but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application-specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example, opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for a certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to a set of both implicit and explicit rules, in an electronically powered domain to place bets on the outcome of a sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to as "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread"; a "money-line" bet. "Money line," "straight bet," "straight-up" can be integrated into the embodiments in a variety of manners.

The "line" refers to the current odds or point spread on a particular event or game. The "point spread" refers to the margin of points by which the favored team must win an event to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick'em" refers to a game when neither team is favored in an event or game. "Line," "cover the spread," "cover," "tie," "pick," and "pick-em" can be integrated into the embodiments in a variety of manners.

To "middle" means to win both sides of a game, wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to a set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points, or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if he wins all the wagers in the "parlay," the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round-robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers are scheduled to start a game start. If they do not, the bet is deemed "no action" and refunded. The "run line" in baseball refers to a spread used instead of the money line. "Listed pitchers" and "no action" and "run line" can be integrated into the embodiments in a variety of manners.

The term "handle" refers to the total amount of bets taken. The term "hold" refers to the percentage of the house wins. The term "juice" refers to the bookmaker's commission, most commonly the 11 to 10 bettors lay on a straight point spread wagers: also known as "vigorish" or "vig." The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations, or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management services are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on-property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for the integration of global and local payment methods. These payment processing services can be integrated into the embodiments in a variety of manners.

Engaging promotions allow customers to treat players to free bets, odds boosts, enhanced access, and flexible cashback to boost lifetime value. Engaging promotions can be integrated into the embodiments in a variety of manners.

"Cash out" or "payout" or "payout" allow customers to make available, on singles bets or accumulated bets with a partial cash-out where each operator can control payouts by always managing commission and availability. The "cash-out" or "payout" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage sports gaming. Business Applications can be integrated into the embodiments in a variety of manners.

State-based integration allows for a given sports gambling game to be modified by states in the United States or countries, based upon the state the player is in, based upon mobile phone or other geolocation identification means. State-based integration can be integrated into the embodiments in a variety of manners.

Game Configurator allows for the configuration of customer operators to have the opportunity to apply various chosen or newly created business rules on the game as well as to parametrize risk management. The game configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery method and licensing in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds to a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real-time view of the game can be seen, and a "bet," which is a computer-generated data point, is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for suggesting wagers based on wagers made by contacts. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include a wagering network 114, which may perform real-time analysis on the type of play and the result of a play or action. The wagering network 114 (or cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114, and may include, but is not limited to, a user ID, a device identifier, a paired device identifier, wagering history, or wallet information for the user. The user database

116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical play database 118 that may contain play data for the type of sport being played in the live event 102. For example, in American Football, for optimal odds calculation, the historical play data may include metadata about the historical plays, such as time, location, weather, previous plays, opponent, physiological data, etc. Further, embodiments may utilize an odds database 120—that contains the odds calculated by an odds calculation module 122—to display the odds on the user's mobile device 108 and take bets from the user through the mobile device wagering app 110.

Further, embodiments may include the odds calculation module 122, which may utilize historical play data to calculate odds for in-play wagers.

Further, embodiments may include a base module 124, which may initiate a wagering module 126, a contact module 128, and a suggested wager module 130.

Further, embodiments may include the wagering module 126, which may trigger if the user places a wager during the live event. After receiving the prompt, the wagering module 126 may receive a user selection of the highlighted element. For example, a user may select a highlighted player, like, Aaron Judge of the New York Yankees who is playing in the 3rd inning against Clayton Kershaw of the Los Angeles Dodgers. Further, the wagering module 126 may retrieve available wagers for the selected element. In one embodiment, the wagering module 126 may retrieve available wagers from the odds database 120. In this example, the wagering module 126 may retrieve the available wagers for Aaron Judge, classifying him as a hitter, such as, a wager of $100 on Aaron Judge hitting a single at odds 4/1 and a wager of $400 on Aaron Judge hitting a home run at odds 5/1 in the 3rd innings of the match between the New York Yankees and Los Angeles Dodgers. Further, the wagering module 126 may display a menu of available wagers related to the selected element. In one embodiment, the menu may be displayed via the wagering app 110 on the mobile device 108. In this example, the wagering module 126 may display a menu of available wagers for Aaron Judge of the New York Yankees hitting against the Clayton Kershaw of the Los Angeles Dodgers in the 3rd inning of the match. The menu may include a wager of $100 on Aaron Judge hitting a single at odds 4/1 and a wager of $400 on Aaron Judge hitting a home run at odds 3/1. Further, the wagering module 126 may receive a wager from the user. For example, the user places a wager of $100 on Aaron Judge of the New York Yankees, playing 3rd innings against Clayton Kershaw of the Los Angeles Dodgers and hitting a single at odds 4/1. Further, the wagering module 126 may constantly monitor the live event 102 for completion. In one case, when the live event 102 has concluded, the wagering module 126 may obtain the results of the live event 102. For example, the wagering module 126 may obtain the results of the live event 102 which may show that Aaron Judge hit a single during the live event 102. In another case, when the live event 102 has not concluded, the wagering module 126 may continue monitoring the live event 102 for completion. Further, the wagering module 126 may compare the result of the live event 102 with the wagers placed by the user to determine a result, i.e., whether the user has won or lost. For example, the user's wager of $100—having Aaron Judge of the New York Yankees playing the 3rd inning against Clayton Kershaw of the Los Angeles Dodgers and hitting a single—is determined to be a win by comparing it with the result of the live event 102—which had Aaron Judge of New York Yankees playing 3rd innings against Clayton Kershaw of the Los Angeles Dodgers and hitting a single. Based on the comparison of the result of the live event 102 and the wagers placed by the user, the wagering module 126 may calculate the balance amount for the user. For example, the user wins the wager of $100 at +400 odds that Aaron Judge will hit a single on the next play, and the result of the live event 102 is that Aaron Judge hits a single. Thus, the updated balance of the user—with an opening balance of $2000—after the completion of the live event 102, will be $2000+$400=$2400. Further, the wagering module 126 may update the account balance of the user who places the wager. In this example, after winning the wager of $100 placed (at odds of 4/1), the wagering module 126 may update the user's balance to $2400.

Further, embodiments may include the contact module 128, which may be executed by the base module 124 if a user executes an icon on the mobile device 108. This module may request inputs from the user for the contact information of the user's friends. This request for input can be satisfied by entering the friend's contact information. It should be obvious to those skilled in the art that there are many ways to obtain a friend's contact information. For instance, by sending a friend an invite link from the wagering network 114 which allows them to input their contact information or by searching through a list of contacts, selecting a friend, and allowing that friend to approve being added the list. Once the friend's contact information is received, it may be stored in a contact database 132.

Further, embodiments may include the suggested wager module 130, which may be executed by the base module 124. During the current play of the live event 102, the module may search the contact database 132 for the user's friends. The suggested wager module 130 may then poll to see if/when one of those contacts places a wager. The suggested wager module 130 may then suggest the same wager to the user.

Further, embodiments may include the contact database 132, which may store, for each user, the friends on their friends' list. This database may store the performance metrics by time and by play so that all the performance metrics can later be shown on a leaderboard.

FIG. 2 illustrates the base module 124. The process may begin with the base module 124 polling, at step 200, for the user activity. User activity may mean that the user is signed into the wagering app 110, used the wagering app 110 in the last minutes, or is actively using the wagering app 110. Users may be able to set themselves as active or inactive. The base module 124 may initiate, at step 202, the wagering module 126. The wagering module 126 may allow the user to place wagers on a live event 102. The base module 124 may initiate, at step 204, the suggested wager module 130. The suggested wager module 130 may suggest wagers to the user based on wagers made by the user's contacts. The base module 124 may poll, at step 206, for a request from the wagering app 110 to add a new contact. This request may be sent from the mobile device 108 by the user. For example, the user may press an "add contact" button. The base module 124 may initiate, at step 208, the contact module 128. The contact module 128 may allow the user to add new contacts, which may be stored in the contact database 132. The base module 124 may return, at step 210, to step 200.

FIG. 3 illustrates the contact module 128. The process may begin with the contact module 128 being initiated, at step 300, by the base module 124. The base module 124 may be prompted to initiate the contact module 128 after the user selects to add contacts from their mobile device 108. The contact module 128 may prompt, at step 302, the user to add a contact. The user may add a contact by entering the user ID of the contact or with another identifier, for example, the user's name, if the identifier is stored in the user database 116. The contact module 128 may search, at step 304, for a matching user ID, or other identifiers, in the user database 116. The contact module 128 may determine, at step 306, if there is a matching entry in the user database 116. If there is a matching entry, the contact module 128 may add, at step 308, the user ID of the matching entry to the contact database 132. The user ID of the contact may be stored as the "contact user ID" and associated with the user ID of the user adding the contact. If there is no matching entry, the contact module 128 may skip to step 310 and send a notification to the mobile device 108, such as, "No contact with that user ID, or other identifiers, has been found." The contact module 128 may then return to step 302. The contact module 128 may end at step 312.

FIG. 4 illustrates the suggested wager module 130. The process may begin with the suggested wager module 130 being initiated at step 400 by the base module 124. The suggested wager module 130 may poll, at step 402, for a new entry in the user database 116. A new data entry may be a wager that has been placed. For example, user Joe Smith's recently-placed bet on the baseball game may be saved as a new data entry in the user database 116. The suggested wager module 130 may extract, at step 404, the new data entry from the user database 116. The suggested wager module 130 may search, at step 406, the contact database 132 for the user ID in the extracted new entry. The suggested wager module 130 may determine, at step 408, if there are any matches for the user ID in the contact database 132. If there are no matches, the suggest wager module 130 may skip to step 420 and end. However, if there are matches, the suggested wager module 130 may select, at step 410, the first match in the contact database 132. The suggested wager module 130 may extract, at step 412, the contact user ID associated with the matching user ID. The suggested wager module 130 may send, at step 414, a notification to the contact, informing them that the user has made a wager. The notification may be sent to the mobile device 108 that is associated with the contact user ID. This notification may include information about the wager. The notification may link the contact user to the wagering module 126, allowing them to wager on the same play. For example, if user Joe Smith makes a wager on a baseball game, a notification may be sent to his contacts, like user Bob Smith. User Bob Smith may then receive a notification in the wagering app 110 on his mobile device 108 which reads, "Joe Smith just put $30 on the Dodgers getting a home run. Click here to join Joe's bet or bet against him.". User Bob Smith may then click on the notification and be directed to the wagering module 126 to place a wager on the play. The suggesting wager module 130 may determine, at step 416, if there is another match in the contact database 132. If there is an additional match, the suggested wager module 130 may select, at step 418, the next match and return to step 412. If there are no other matches in the contact database 132, the suggested wager module 130 may end at step 420

FIG. 5 illustrates the contact database 132. The contact database 132 may contain user IDs like JS1234. The contact database 132 may also contain the names of the contacts associated with the user ID, such as, "Bob Smith." The contact database 132 may also contain the user ID associated with the contact, for example, BS4345.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of informing a user of wagers of one or more contacts of the user in a sports betting network, comprising:
   receiving contact data of the one or more contacts from a user on the sports betting network;
   searching a user database for the received contact data;
   storing the contact data with an associated data set of the one or more contacts in a contact database associated with the user, and notifying the user when storing the contact data is not possible;
   prompting the user to add one or more additional contacts from the user database;
   determining when a new wager data entry has been stored in the user database,
   extracting a user ID from the new wager data entry;
   comparing the user ID with contact data in the contact database associated with the user for a match;
   automatically sending, by a suggested wager module of the sports betting network, a notification to inform the user of the new wager data entry when the user ID matches information in the contact data, wherein the notification includes at least one of the amount of the wager, a type of wager, information associated with a second user associated with the user ID who placed the wager, and a link allowing the user to wager on a same action;
   accepting, by the sports betting network, a wager of the user on the same action as the new wager data entry;
   storing wager results in a leaderboard module that records user ID, time, and play type associated with one or more new wager data entries; and
   displaying a personalized leaderboard to the user which includes information about at least one of wagers, time, play type, and user ID of the one or more contacts from a user on the sports betting network.

2. The method of claim 1, wherein the contact data further comprises a user ID.

3. A system for suggesting wagers to a user based on one or more contacts of the user in a sports betting network, comprising:
- a base module;
- a contact module;
- a suggested wager module;
- a contact database;
- a user database;
- a leaderboard module,
- wherein the base module polls for user activity, initiates the suggested wager module, polls for a request to add a new contact, and initiates the contact module;
- wherein the contact module receives contact data from a user, searches the user database for a match with the received contact data, and stores the received contact data in the contact database, and informs the user when storing the contact data is not possible, and prompts the user to add one or more additional contacts from the user database;
- wherein the suggested wager module polls for at least one new wager data entry in the user database, extracts the new wager data entry, compares the extracted wager data entry with the contact database for a match, and automatically informs the user of the wager data entry if there is a match;
- wherein the leaderboard module stores wager results and records user ID, time, and play type associated with one or more new wager data entries, and displays a personalized leaderboard to the user which includes information about wagers, time, play time, and user ID of the one or more contacts from a user on the sports betting network; and
- wherein the contact database contains at least one user ID and at least information about a contact of the user,
- wherein at least one of a notification, banner, message, text, or pop-up that informs the user of the wager data entry and includes a link to place a wager on a same action recorded in the wager data entry,
- wherein the sports betting network accepts the wager of the user on the same action as the wager data entry.

\* \* \* \* \*